United States Patent
Winter et al.

(10) Patent No.: US 6,717,546 B2
(45) Date of Patent: Apr. 6, 2004

(54) METHOD FOR CORRECTING THE VISUAL RANGE OF A DISTANCE SENSOR THAT IS ASSEMBLED IN SUCH A WAY THAT SAID SENSOR IS OFFSET FROM THE CENTER LINE OF A MOTOR VEHICLE

(75) Inventors: Klaus Winter, Schwieberdingen (DE); Hermann Winner, Karlsruhe (DE); Jens Lueder, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/959,145

(22) PCT Filed: Jan. 17, 2001

(86) PCT No.: PCT/DE01/00162

§ 371 (c)(1),
(2), (4) Date: Jun. 14, 2002

(87) PCT Pub. No.: WO01/61376

PCT Pub. Date: Aug. 23, 2001

(65) Prior Publication Data

US 2002/0163464 A1 Nov. 7, 2002

(30) Foreign Application Priority Data

Feb. 17, 2000 (DE) .......................................... 100 07 217

(51) Int. Cl.$^7$ ........................... G01S 7/40; G01S 13/08; G01S 13/93; G01S 17/93
(52) U.S. Cl. ........................ 342/165; 342/70; 342/118; 342/128; 342/173; 342/174; 342/195; 356/4.01; 356/5.01
(58) Field of Search ............................. 342/70, 71, 72, 342/159–175, 195, 27, 28, 118, 119–146; 356/4.01–4.1, 5.01–5.15

(56) References Cited

U.S. PATENT DOCUMENTS

| | | | | |
|---|---|---|---|---|
| 5,546,086 A | * | 8/1996 | Akuzawa et al. | 342/70 |
| 5,754,123 A | | 5/1998 | Nashif et al. | |
| 6,025,797 A | * | 2/2000 | Kawai et al. | 342/175 |
| 6,107,956 A | * | 8/2000 | Russell et al. | 342/70 |
| 6,119,067 A | * | 9/2000 | Kikuchi | 342/70 |

FOREIGN PATENT DOCUMENTS

| | | |
|---|---|---|
| DE | 195 01 612 | 7/1996 |
| DE | 197 07 590 | 9/1998 |
| EP | 0 443 643 | 8/1991 |
| EP | 0 526 424 | 2/1993 |
| EP | 0 775 921 | 5/1997 |
| EP | 0 859 425 | 8/1998 |
| EP | 0903 714 | 3/1999 |
| EP | 0 905 526 | 3/1999 |
| EP | 0 915 350 | 5/1999 |
| WO | 00 73818 | 12/2000 |
| WO | WO 01 11387 | 2/2001 |
| WO | WO 01 31362 | 5/2001 |

* cited by examiner

Primary Examiner—Bernarr E. Gregory
(74) Attorney, Agent, or Firm—Kenyon & Kenyon

(57) ABSTRACT

A method for correction of the detection range of a distance sensor, which is installed with an eccentricity laterally offset with respect to the central axis of a motor vehicle. In order to correct the detection range, a correction angle is used, with which the eccentricity of the distance sensor is corrected at the time of its installation. Thus the distance sensor is not aligned parallel to the longitudinal axis of the vehicle, but to its central axis. Thus, the detection range is advantageously covered approximately symmetrically to the longitudinal axis of the vehicle. The correction angle is determined either empirically, via appropriate test measurements, or mathematically.

8 Claims, 2 Drawing Sheets

METHOD FOR CORRECTING THE VISUAL RANGE OF A DISTANCE SENSOR THAT IS ASSEMBLED IN SUCH A WAY THAT SAID SENSOR IS OFFSET FROM THE CENTER LINE OF A MOTOR VEHICLE

FIELD OF THE INVENTION

The present invention is based on a method for correction of the detection range of a distance sensor which is not installed in the middle along the central axis, but at a lateral offset.

BACKGROUND INFORMATION

Distance sensors, in particular on the basis of a radar sensor or a lidar sensor, are used in the front of a motor vehicle in order to detect stationary or preceding and slower vehicles using a cruise control. The distance sensor detects in its detection range of approximately 150 meters and covers an angular range of approximately 10°. The ideal installation position for a sensor with such a narrow detection range is the center of the vehicle's front. For technical and optical reasons, this area is not always available for installation, so that a position clearly outside the vehicle center must be used for the installation of the distance sensor. Due to the eccentricity, in addition to poorer coverage of one side in the short range, this results in a difference in the detection behavior, which can be sensed by the driver, in curves if this distance sensor is aligned parallel to the vehicle's axis.

SUMMARY OF THE INVENTION

The method according to the present invention for correction of the detection range of a distance sensor which is installed with an eccentricity laterally offset with respect to the central axis of the motor vehicle has the advantage over the related art that the actual detection range is optimized so that it becomes approximately symmetrical with respect to the central axis of the motor vehicle. Thus better coverage is achieved, in particular in the short range, on the side which is farthest away from the site of installation of the distance sensor. It is considered particularly advantageous that, for example, when driving in a staggered convoy, the vehicle traveling behind can detect the vehicle traveling ahead better and more reliably.

It is particularly advantageous that the correction angle (aiming-off angle) is determined as a function of the eccentricity. For a greater eccentricity, the correction angle is selected to be greater than for a smaller eccentricity, so that optimum coverage of the lane, comparable to that in the case of installation in the center, is always guaranteed.

The correction angle can be determined advantageously and in a simple manner either empirically or with the help of a formula as a function of the minimum curve radius. This optimization method makes it then possible to optimize the detection range for the distance sensor, so that the difference with respect to a sensor installed in the center is as small as possible and the greatest possible detection range is covered, in particular even when traveling around a curve.

Since the correction angle is up to 1° in practice, an adjustment of the distance sensor at the time of the installation is hardly noticeable optically, so that the design is not negatively affected.

The use of the distance sensor in connection with a cruise control system, so that the driver does not need to continuously monitor the safety distance taking into consideration the speed of travel, in particular when traveling in a convoy, is considered particularly advantageous.

DETAILED DESCRIPTION

Figure 1:
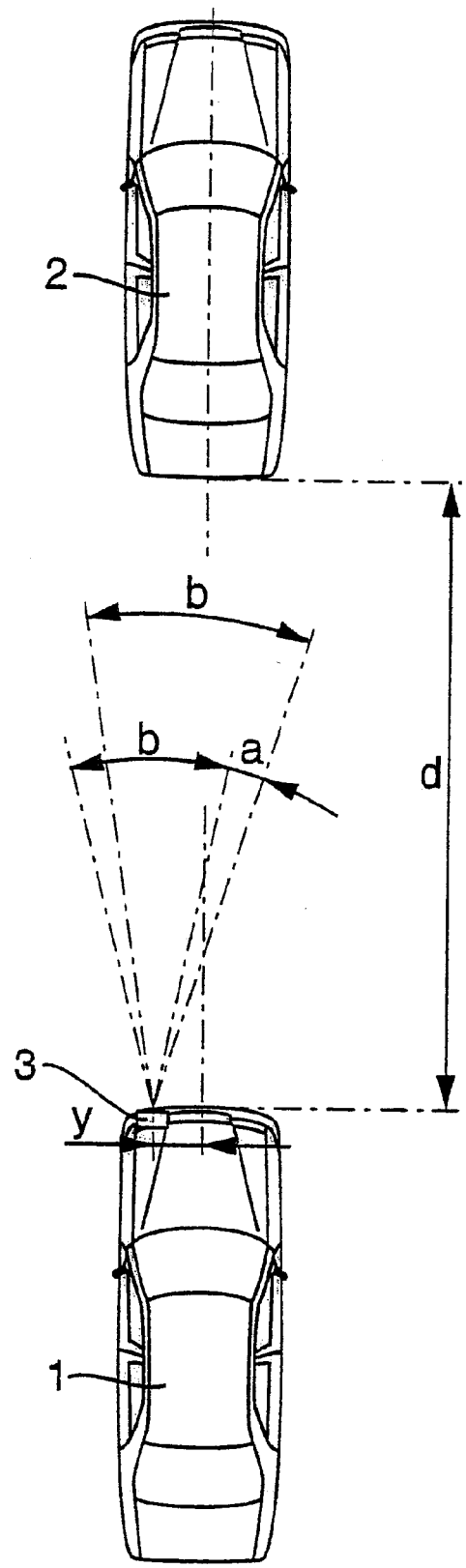
FIG. 1 shows a schematic with a motor vehicle arrangement.

FIG. 1 shows a vehicle arrangement on a road, a motor vehicle 1 detecting an obstacle, for example, a preceding vehicle 2, at a distance d, using a distance sensor 3. Distance sensor 3 has been installed in the front of the motor vehicle 1, not in the center, but offset with an eccentricity y, for example, on the left side. The antennas are aligned with the road in the direction of travel. Distance sensor 3 would have a detection range with a detection angle b as illustrated with a broken line in FIG. 1 if it were installed parallel to the central axis M of the vehicle. This detection range shown in broken lines corresponds to a customary alignment of distance sensor 3 with respect to central axis M of the vehicle.

As FIG. 1 further shows, within its detection range shown in broken lines, distance sensor 3 would only detect preceding vehicle 2 in the right-hand area of its detection range, although both vehicles are traveling along imaginary central axis M. When traveling around a curve, in particular in a left turn with a correspondingly small radius, it might happen that preceding vehicle 2 can no longer be detected, since it moves out of the detection range.

Distance sensors 3 are essentially known and operate by the principle of reflection on the basis of transmitted radar beams or light beams. In order to determine greater distances up to 150 meters or more, they have a relatively narrow beam angle of approximately 10°. In order to still detect, as far as possible, all obstacles in the direction of travel of vehicle 1, according to the present invention distance sensor 3 is installed at the factory or workshop with a correction angle a, which is aligned with the central axis. Thus the detection range with beam angle b is shifted as illustrated by the extended beam paths of FIG. 1. Preceding vehicle 2 is therefore detected approximately in the center of the detection range. In particular, when traveling around a curve, the probability of preceding vehicle 2 being continuously detected is greater and therefore distance sensor 3 can determine distance d more reliably. The risk of losing the target is now about the same for curves to the left and to the right.

Correction angle a can be determined in two different ways. One very simple way is the empirical determination of the detection range as a function of distance d by measuring it. The values can be stored in a memory and are then available for later evaluation.

As an alternative, correction angle a can also be determined by estimation. This principle is elucidated in detail below with reference to FIG. 2.

As mentioned previously, the calculation is based on the fact that, both in a right and a left turn, detection losses begin with approximately the same radius. Assuming that distance sensor 3 is combined with an ACC (adaptive cruise control) system, a minimum curve radius $R_{min}$ of the travel path for which a target loss may occur is obtained. This loss of target depends, among other things, on distance d to the obstacle.

Figure 2:
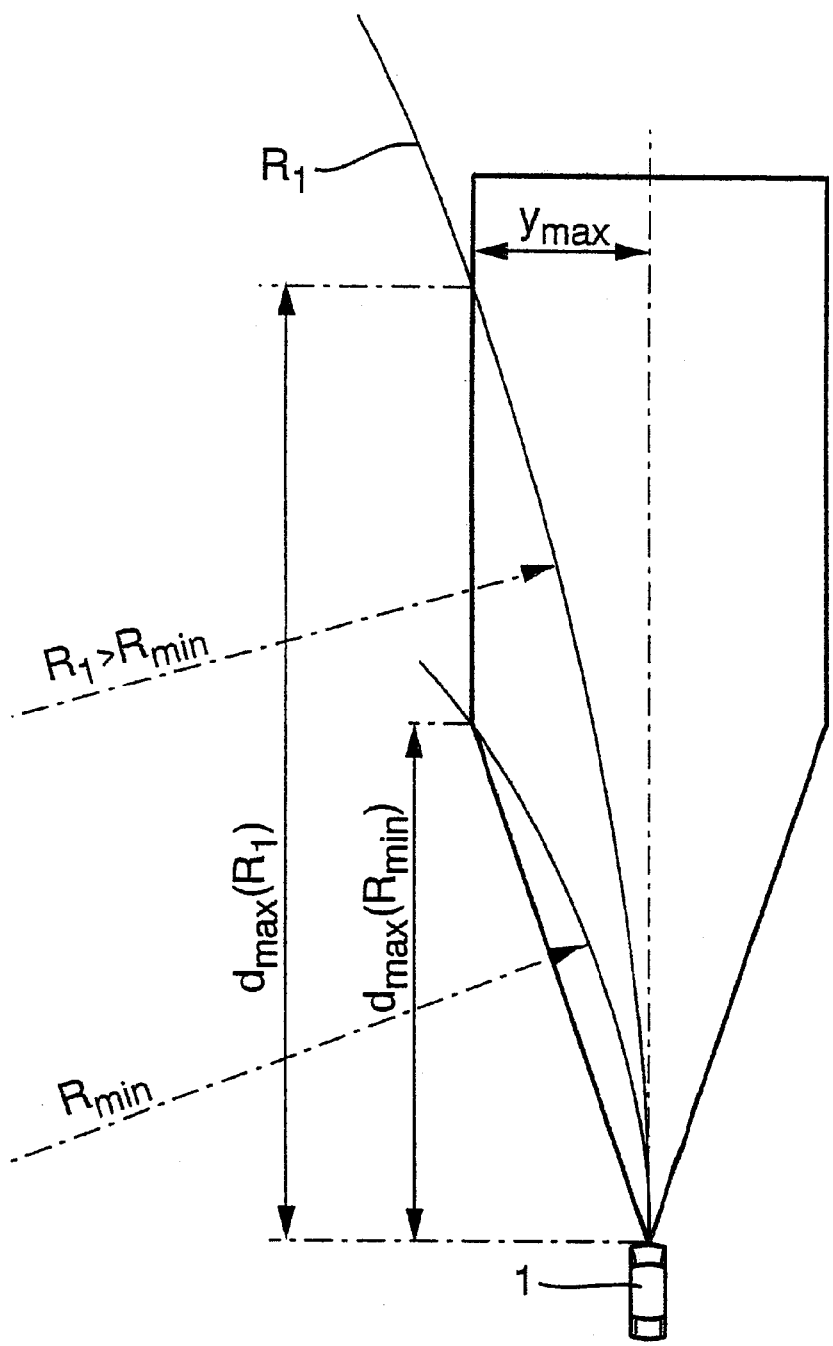
FIG. 2 shows a schematic for determining the correction angle.

FIG. 2 shows a section of a road segment, a minimum radius $R_{min}$ and a larger radius $R_1$ being shown for a left turn. Furthermore, maximum distances $d_{max}(R_{min})$, $d_{max}(R_1)$ associated with radii $R_{min}$ and $R_1$, respectively, are shown. The maximum distances are determined here assuming that a maximum curve speed is specified for a maximum transverse acceleration of vehicle 1. This maximum curve speed is multiplied by a safety time interval $T_{max}$ so that the maximum range $d_{max}(R)$, i.e., the maximum distance to the obstacle is obtained. The maximum width $y_{max}$ of the detection field to one side for the maximum distance $d_{max}$ is independent of the radius of the curve.

$$y_{max} = \tfrac{1}{2} \cdot \tau_{max}^2 + a_{lateral,max},$$

where $a_{lateral,max}$ is the maximum transverse acceleration.

Correction angle a is determined from the quotient of eccentricity y and maximum range $d_{max}$ for $R=R_{min}$. Thus the detection range for this distance is symmetrical with respect to the longitudinal vehicle axis with a good approximation:

$$d_{max}(R_{min}) = \tau_{max} * \sqrt{a_{lateral,max}} * R_{min}$$

Correction angle a is obtained from the formula:

$$a = Y/d_{max}(R_{min})$$

Using a numerical example, the correction angle obtained is:

$$a = y/47 \; m, \text{ i.e., } a \approx 1.2° \cdot y/m$$

assuming $R_{min}=500$ m, transverse acceleration $a_{lateral}=2$ m/s$^2$ and $\tau=1.5$ s for typical situations. For example, for y=0.50 m, a correction angle a=0.6° is obtained with which distance sensor 3 can be adjusted in the workshop with respect to central axis M.

What is claimed is:

1. A method for correcting a detection range of a distance sensor, comprising:

installing a distance sensor with an eccentricity laterally offset with respect to a central axis of a motor vehicle;

aligning the distance sensor with respect to the central axis of the motor vehicle at a correction angle; and determining the correction angle as a function of the eccentricity.

2. The method according to claim 1, wherein the correction angle is up to about 1°.

3. The method according to claim 1, further comprising permanently adjusting the correction angle at a time of installation of the distance sensor in the motor vehicle.

4. The method according to claim 1, further comprising:

detecting an obstacle within a detection range of the distance sensor at an angle; and determining at least one of a distance and a position of the obstacle relative to the motor vehicle.

5. A method for correcting a detection range of a distance sensor, comprising:

installing a distance sensor with an eccentricity laterally offset with respect to a central axis of a motor vehicle;

aligning the distance sensor with respect to the central axis of the motor vehicle at a correction angle; and determining the correction angle empirically and storing the correction angle in a table.

6. A method for correcting a detection range of a distance sensor, comprising:

installing a distance sensor with an eccentricity laterally offset with respect to a central axis of a motor vehicle;

aligning the distance sensor with respect to the central axis of the motor vehicle at a correction angle; and determining the correction angle according to the equation $$a = y/d(R_{min}),$$

where $d(R_{min})$ is a function of a minimum curve radius $R_{min}$, valid for a system layout.

7. A method for correcting a detection range of a distance sensor, comprising:

installing a distance sensor with an eccentricity laterally offset with respect to a central axis of a motor vehicle;

aligning the distance sensor with respect to the central axis of the motor vehicle at a correction angle; and selecting the correction angle so as to cover about a same detection range for a right turn and a left turn.

8. A method for correcting a detection range of a distance sensor, comprising:

installing a distance sensor with an eccentricity laterally offset with respect to a central axis of a motor vehicle;

aligning the distance sensor with respect to the central axis of the motor vehicle at a correction angle; and the detection range of the distance sensor is corrected for a cruise control system of the motor vehicle.

* * * * *